US011315296B2

(12) United States Patent
Mongrain et al.

(10) Patent No.: US 11,315,296 B2
(45) Date of Patent: Apr. 26, 2022

(54) DYNAMICALLY VARYING VISUAL PROPERTIES OF INDICATORS ON A DIGITAL MAP

(71) Applicant: GOOGLE INC., Mountain View, CA (US)

(72) Inventors: Scott Mongrain, Mountain View, CA (US); Bailiang Zhou, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 30 days.

(21) Appl. No.: 15/821,657

(22) Filed: Nov. 22, 2017

(65) Prior Publication Data

US 2019/0156538 A1    May 23, 2019

(51) Int. Cl.
| | | |
|---|---|---|
| *G06T 11/60* | (2006.01) | |
| *G06F 3/04845* | (2022.01) | |
| *G06T 3/20* | (2006.01) | |
| *G06T 3/40* | (2006.01) | |
| *G06T 11/00* | (2006.01) | |

(Continued)

(52) U.S. Cl.
CPC .......... *G06T 11/60* (2013.01); *G01C 21/3682* (2013.01); *G06F 3/04845* (2013.01); *G06F 16/29* (2019.01); *G06F 16/9038* (2019.01); *G06F 16/951* (2019.01); *G06T 3/20* (2013.01); *G06T 3/40* (2013.01); *G06T 11/001* (2013.01);
(Continued)

(58) Field of Classification Search
CPC ... G06T 11/60; G06T 3/20; G06T 3/40; G06T 11/001; G06T 2200/24; G01C 21/3682; G06F 16/29; G06F 16/951; G06F 16/9038; G06F 3/04845; G06F 3/04842; G06F 3/0488

USPC ......................................................... 345/428
See application file for complete search history.

(56) References Cited

U.S. PATENT DOCUMENTS 7,773,101 B2    8/2010    Shoemaker
8,031,206 B2    10/2011    Shoemaker
(Continued)

FOREIGN PATENT DOCUMENTS

EP    2 610 589 A1    7/2013
JP    2003-254761 A    9/2003
(Continued)

OTHER PUBLICATIONS

International Search Report and Written Opinion for Application No. PCT/US2018/061431, dated Apr. 29, 2019.
(Continued)

*Primary Examiner* — Maurice L. McDowell, Jr.
(74) *Attorney, Agent, or Firm* — Marshall, Gerstein & Borun LLP

(57) ABSTRACT

A digital map is displayed via a user interface in a map viewport. The digital map includes various features representing respective entities in a geographic area, each of the features being displayed at a same level of magnification. Geolocated points of interest are determined within the geographic area, and a focal point of the map viewport is determined. For each of indicators, the size of the indicator is varied in accordance with the distance between the geographic location corresponding to the indicator and the geographic location corresponding to the focal point of the map viewport. The indicators then are displayed on the digital map.

18 Claims, 7 Drawing Sheets

(51) Int. Cl.
  *G06F 16/29* (2019.01)
  *G06F 16/951* (2019.01)
  *G06F 16/9038* (2019.01)
  *G01C 21/36* (2006.01)
  *G06F 3/04842* (2022.01)
  *G06F 3/0488* (2022.01)

(52) U.S. Cl.
  CPC ........ *G06F 3/0488* (2013.01); *G06F 3/04842* (2013.01); *G06T 2200/24* (2013.01)

(56) References Cited

U.S. PATENT DOCUMENTS

| | | | |
|---|---|---|---|
| 9,323,413 | B2 | 4/2016 | Baar et al. |
| 2004/0260464 | A1* | 12/2004 | Wong ................ G01C 21/3611 701/533 |
| 2007/0064018 | A1* | 3/2007 | Shoemaker ............ G06Q 30/02 345/660 |
| 2007/0097150 | A1* | 5/2007 | Ivashin ................ G06F 3/0485 345/660 |
| 2009/0113296 | A1 | 4/2009 | Lacy et al. |
| 2010/0115459 | A1 | 5/2010 | Kinnunen et al. |
| 2011/0047509 | A1* | 2/2011 | Arrasvuori ........... G09B 29/007 715/815 |
| 2011/0313657 | A1* | 12/2011 | Myllymaki ........ G01C 21/3682 701/438 |
| 2011/0316884 | A1* | 12/2011 | Giambalvo ......... G06F 3/04815 345/660 |
| 2013/0073988 | A1* | 3/2013 | Groten .............. G01C 21/3679 715/753 |
| 2013/0169664 | A1* | 7/2013 | Strassenburg-Kleciak ................. G09G 5/02 345/589 |
| 2013/0311340 | A1* | 11/2013 | Krishnan ........... G06Q 30/0633 705/27.2 |
| 2014/0108969 | A1* | 4/2014 | Joel ......................... G06T 3/40 715/760 |
| 2014/0244165 | A1* | 8/2014 | Bells .................... G01C 21/367 701/455 |
| 2014/0267282 | A1* | 9/2014 | Ren ........................ G01C 21/00 345/428 |
| 2016/0080438 | A1* | 3/2016 | Liang .................. G06F 3/04812 715/753 |
| 2016/0105338 | A1* | 4/2016 | Fletcher .................. H04L 43/16 709/224 |
| 2016/0170611 | A1* | 6/2016 | Hao ..................... G09B 29/007 715/781 |
| 2016/0180561 | A1* | 6/2016 | Dobrowolski .......... G06T 11/60 345/635 |
| 2017/0147681 | A1* | 5/2017 | Tankersley .......... G06Q 10/00 |
| 2017/0205994 | A1* | 7/2017 | Huffman ............... G06F 3/0484 |
| 2018/0052593 | A1* | 2/2018 | Bemel-Benrud ... G06F 3/04847 |
| 2018/0322174 | A1* | 11/2018 | Vasilyev ............... G06F 16/248 |
| 2018/0329924 | A1 | 11/2018 | Asai |

FOREIGN PATENT DOCUMENTS

| | | | |
|---|---|---|---|
| JP | 2007-003743 A | 1/2007 | |
| JP | 2009-230248 A | 10/2009 | |
| JP | 2011-022077 A | 2/2011 | |
| JP | 2012-203587 A | 10/2012 | |
| JP | 2013-195252 A | 9/2013 | |
| WO | WO-2007083418 A1 * | 7/2007 | ............. G01C 21/36 |
| WO | WO-2017/131161 A1 | 8/2017 | |

OTHER PUBLICATIONS

Partial Search Report for Application No. PCT/US2018/061431, dated Mar. 6, 2019.
Examination Report for European Application No. 18816367.9, dated Mar. 26, 2021.
Notice of Reasons for Rejection for Japanese Application No. 2019-568613, dated Mar. 29, 2021.
First Examination Report for India Application No. 201947051470, dated Apr. 16, 2021.

* cited by examiner

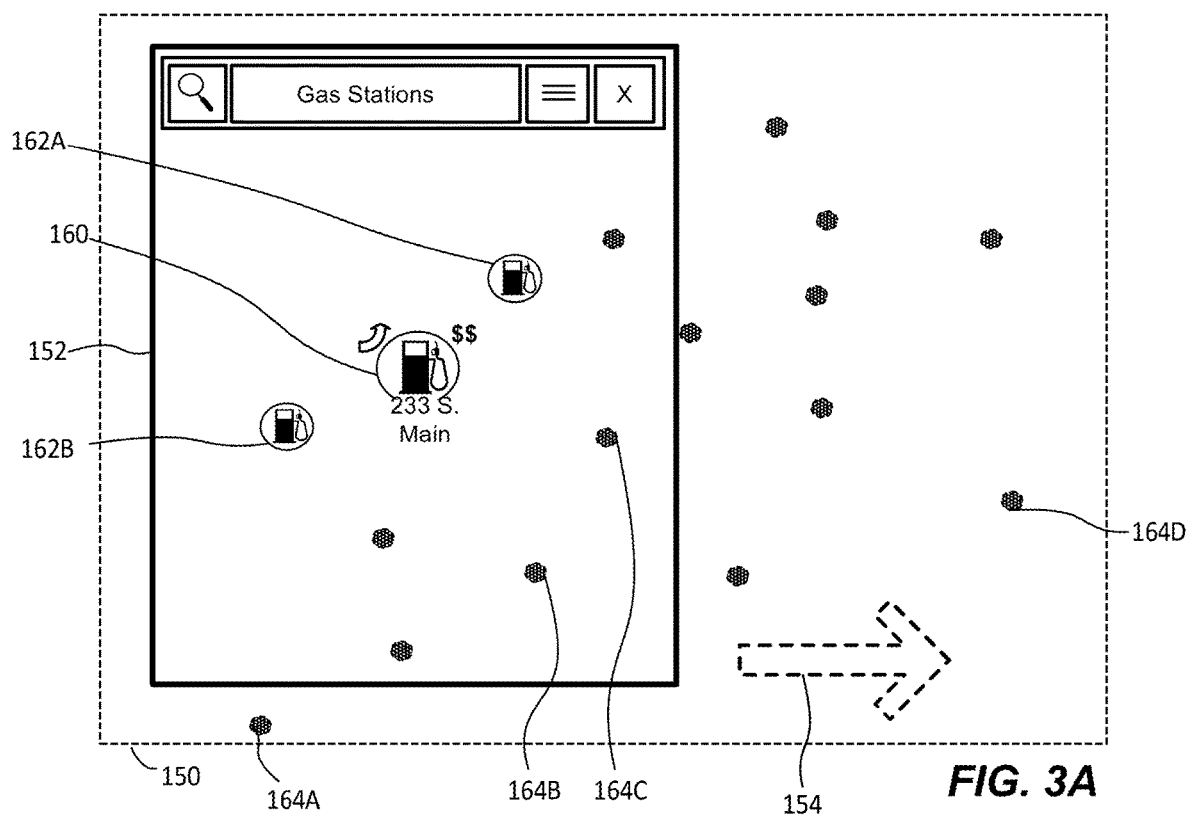
*FIG. 3A*
*FIG. 3B*
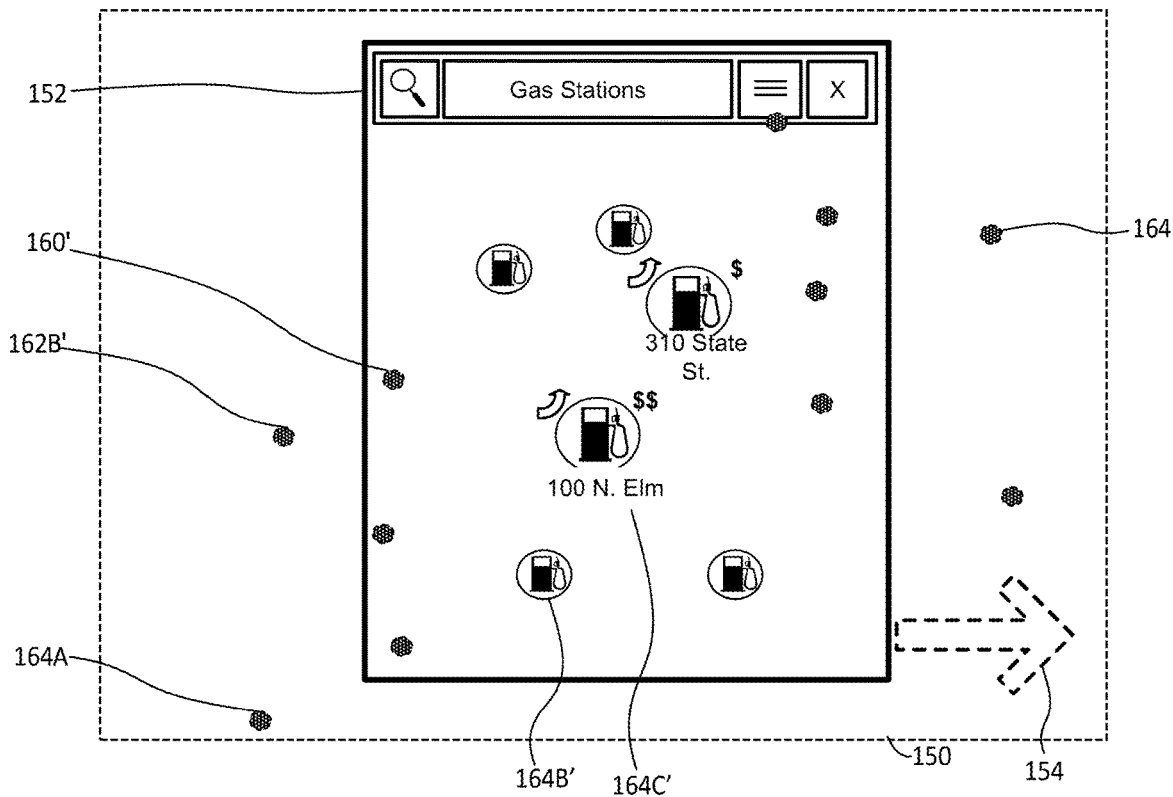

DYNAMICALLY VARYING VISUAL PROPERTIES OF INDICATORS ON A DIGITAL MAP

FIELD OF TECHNOLOGY

This disclosure relates to interactive geographic applications and, more particularly, to dynamically varying visual properties of indicators that illustrate locations on a digital map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A variety of computing devices support geographic software applications for displaying interactive digital maps of geographic areas. A geographic application typically provides directional, rotational, and zoom controls for positioning a window defining a viewable portion of the digital map, which can be referred to as "map viewport," over the desired location. For example, these controls can be provided in the form of buttons overlaying the digital map. As another example, a geographic application operating in a device equipped with a touchscreen can support user gestures, so that the user can pan across the digital map by swiping her finger in the desired direction, zoom in on an area by pinching two fingers together, zoom out on an area by spreading two fingers apart, etc.

Some geographic applications also generate indicators, such as dots for example, to depict the locations of points of interest on digital maps. For example, a geographic application can indicate the results of a search query by displaying dots at the corresponding locations.

SUMMARY

A geographic application of this disclosure dynamically varies one or several visual properties of indicators representing places or events on a digital map, so as to improve visibility of the indicators likely to be of higher interest to the user, improve utilization of screen real estate, reduce the probability of erroneous selection of content, etc. Examples of visual properties can include size, color, and amount of text. The geographic application can vary the visual properties independently of the visual properties of the underlying digital map. In various implementations and/or scenarios, the geographic application can vary the visual properties of an indicator in accordance with the distance between the indicator and the geometric center of the map viewport, between the indicator and the point of contact with the touchscreen on which the map viewport is displayed, between the indicator and a point of the digital map corresponding to the current location of the user's computing device, etc.

More particularly, one embodiment of these techniques is a method for displaying geographic content in a computing device. The method includes displaying, via a user interface within a map viewport, a digital map including features representing respective entities in a geographic area, each of the features being displayed at the same level of magnification. The method further includes determining geolocated points of interest within the geographic area, determining a focal point of the map viewport, and displaying, within the map viewport, respective indicators for the points of interest overlaid on the map. For each of the indicators, the method includes varying a size of the indicator in accordance with a distance between a geographic location corresponding to the indicator and a geographic location corresponding to the focal point of the map viewport.

In another embodiment, a computing device includes a user interface, processing hardware (such as one or more processors) coupled to the user interface; and a non-transitory computer-readable medium storing instructions. When executed by the processing hardware, the instructions cause the computing device to display, via the user interface within a map viewport, a digital map including features representing respective entities in a geographic area, each of the plurality of features being displayed at a same level of magnification; determine geolocated points of interest within the geographic area; determine a focal point of the map viewport; and display, within the map viewport, respective indicators for the plurality of points of interest overlaid on the map, including, for each of the indicators, vary a size of the indicator in accordance with a distance between a geographic location corresponding to the indicator and a geographic location corresponding to the focal point of the map viewport.

In yet another embodiment, a method for displaying geographic content can be implemented a computing device. The method includes providing, via a user interface, a digital map within a map viewport to depict a first geographic area, the map defining a currently viewable portion of the digital map; panning, by the one or more processors, the map viewport relative to the digital map in accordance with user commands received via a user interface, to depict a second geographic area at a same zoom level as the first geographic area, the first geographic area and the second geographic area overlapping to define a region of overlap; and displaying an indicator of a point of interest in the region of overlap, including modifying one or more visual characteristics of the indicator as the map viewport is panned from the first geographic area to the second geographic area.

BRIEF DESCRIPTION OF THE DRAWINGS

FIGS. 3A and 3B schematically illustrate movement of a map viewport relative to a layer of indicators and varying visual properties of the indicators in view of the movement, which can be implemented in the computing device of FIG. 1;

DETAILED DESCRIPTION OF THE DRAWINGS

Generally speaking, geographic software executing on a computing device is configured to provide an interactive digital map of a geographic area and display indicators of places or events in response to geographic queries or implicit requests for suggestions, for example. To more efficiently utilize screen real estate and improve "tappability" so as to reduce the probability that the user erroneously selects a wrong indicator, the geographic software dynamically varies the visual properties of interactive indicators. The geographic software presents an indicator located closer to a certain focal point on the screen in a more prominent manner. As discussed in more detail below, the geographic software can increase the size of an indicator, use a brighter color, provide more text and/or graphic detail, etc.

Figure 1:
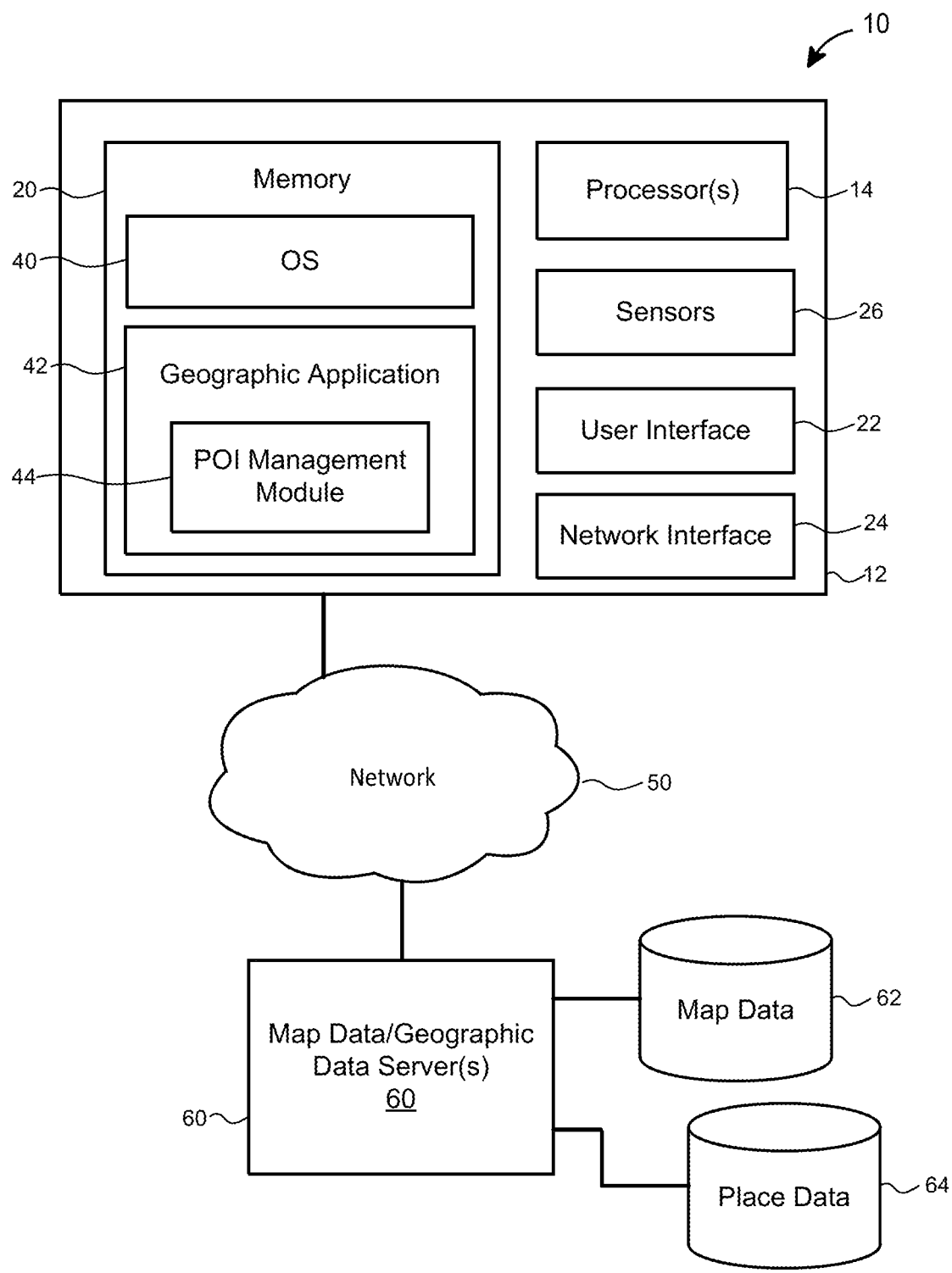
FIG. 1 is a block diagram of an example system in which the techniques of this disclosure for dynamically varying visual properties of indicators can be implemented.

An example system 10 in which these techniques can be implemented is illustrated in FIG. 1. The system 10 includes a user device 12, which can be a portable device such as a smartphone or a tablet computer, a non-portable device such as a desktop computer, or a special-purpose computing device such as a navigator, for example. The user device 12 can include one or more processors 14, such as one or several central processing units (CPUs) and or several graphics processing units (GPUs), a computer-readable memory 20 which can include persistent (e.g., flash disk) and/or non-persistent (e.g., random access memory (RAM)) components, a user interface 22 which can include, for example, a touchscreen or a display device along with an input device, a network interface 24 for transmitting and receiving data via wired and/or wireless communication links, and one or more sensors 26 which can include a positioning unit such as a Global Positioning Service (GPS) module, an accelerometer, a gyroscope, etc.

The user interface 22 can be configured to process typed commands, voice commands, finger gestures applied to a touch-sensitive surface, three-dimensional hand gestures, mouse clicks, and other suitable types of user input. Similarly, the user interface 22 can be configured to display content, generate audio signals, provide haptic (e.g., vibratory) output, etc. In some implementations particularly relevant to the techniques of this disclosure, the user device 12 is a smartphone, and the user interface 22 includes a touchscreen with a screen significantly smaller than the screen of a laptop computer, for example.

The memory 20 can store instructions, executable on the one or more processors 14, that implement an operating system 40 and various software applications such as a geographic application 42. The geographic application 42 can be a special-purpose software application dedicated to generating geographic content such as interactive digital maps, navigation directions, results of geographic queries, etc. In another implementation, a general-purpose browser application executes a script and/or application programming interface (API) functions for generating geographic content. Although the functionality of providing interactive digital maps and indicators with variable visual properties can be provided in the form of an API, a library, a plug-in, or another software component invoked by another software application, the software module 42 is referred to in this disclosure as a geographic application. The geographic application 42 can operate on map data stored locally in the memory 20 or receive geographic content from an online geographic service, as discussed below. The geographic application 42 can include an indicator management module 44 configured to select visual properties for indicators, as discussed below.

With continued reference to FIG. 1, the communication network 50 can be the Internet or any other suitable network that includes wired and/or wireless communication links. The user device 12 in general can communicate with any number of servers to receive various geographic content such as map data, navigation directions, responses to geographic queries, etc. For simplicity, FIG. 1 illustrates only one map data/geographic data server 60 coupled to a map database 62, which can store map data describing various natural geographic features (e.g., rivers, mountains, forests) as well as artificial geographic features (e.g., roads, buildings, parks), etc. The map data can include descriptions of map features in a vector graphics format as sets of interconnected vertices and/or bitmap images, for example. The server 60 can retrieve map data for generating a map image for a certain geographic region and provide the map data to the user device 12. The server 60 also can be coupled to a place page database 64 storing information regarding various points of interest and geolocated events. The information can include business hours, reviews, associated media files, for example. The server 60 can retrieve place page data from the place page database 64 to service geographic queries, for example.

The system 10 in general can include one or several servers 60 in any suitable configuration, including a multi-tiered configuration in which front-end servers process user requests, and back-end servers configured to execute batch jobs such as generating map tiles. Similar to the user device 12, the one or several servers 60 can include processing hardware such as CPUs, GPUs, etc. and non-transitory computer-readable memory storing instructions executable by the processing hardware.

In operation, the geographic application 42 can receive user input and retrieve map data from the server 60 for generating an interactive digital map in accordance with the user input. The geographic application 42 also can receive from the server 60 POI data for various points of interest (POIs), which can correspond to places in the geographic area represented by the digital map or events that take place in this geographic area. In some cases, the geographic application 42 can retrieve map data and/or POI data from a local cache in the memory 20.

In an example scenario, a user located near the Museum of Modern Art in San Francisco, Calif. launches the geographic application on the user device 12. The user positions the map viewport over the city of San Francisco, and the geographic application 42 sends to the server 60 the coordinates of the map viewport and an indication of the current zoom level (i.e., the level of magnification) of the digital map in the map viewport. The server 60 in response provides map data for generating a digital map of San Francisco to the user device 12. The user then types in and submits the geographic query "used book stores" to the geographic application 42, which forwards the query to the server 60, along with an indication of the current viewport position and the zoom level. The server 60 obtains several search results using the place database 64 and transmits these results to the user device 12. Each geographic search result includes the name of the store, the address of the store, the business hours, a brief description, and a rating. In this example scenario, the level of magnification at which the digital map is displayed is relatively low (to depict the entire city of San Francisco) and the number of search results is relatively high, with multiple search results concentrated in the same part of the city. If displayed with the same visual properties, the indicators of these search results define dense clusters, and it is generally difficult for the use to correctly tap on the desired indicator without first zooming. The indicator management module 44 selects a point corresponding to the user's current location as the focal point and selects visual properties for each indicator in view of the distance to the focal point, without modifying the underlying digital map. In this manner, the geographic application 42 provides visual emphasis to those indicators that are likely to be of more interest to the user, thereby reducing the probability of a wrong tap and improving the overall ergonomics of interacting with the digital map.

Figure 2:
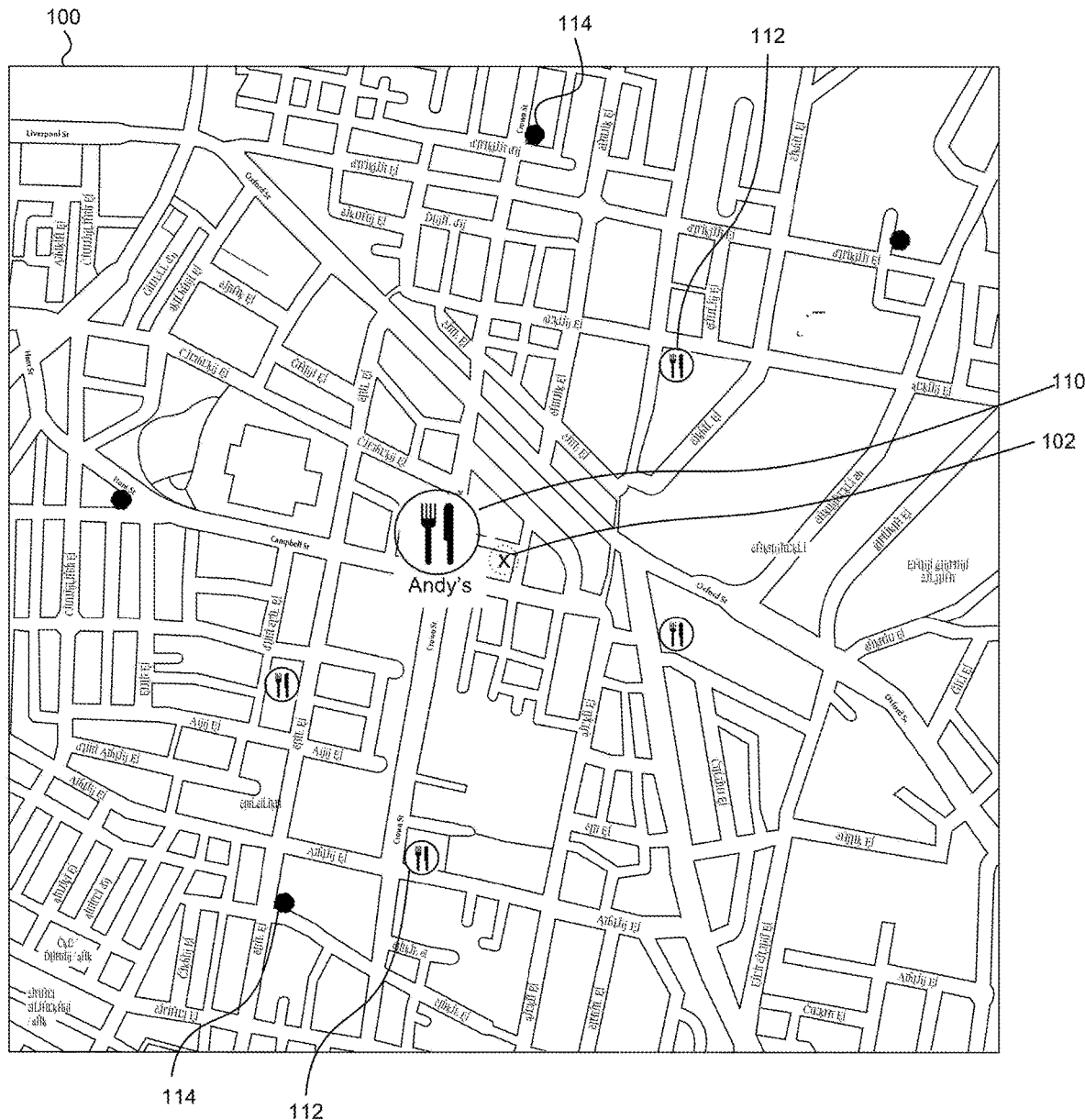
FIG. 2 illustrates an example digital map and indicators with dynamically varied visual properties overlaid on the digital map, which can be displayed on the computing device of FIG. 1.

Referring to FIG. 2, the geographic application 42 in another example scenario displays a digital map 100 in a map viewport centered at a point 102. The digital map 100 in general can include multiple map features, or simply "features," that represent various natural (e.g., hills, mountains, forests, rivers, lakes) as well as artificial (e.g., roads, buildings, parks, bridges) entities located in the corresponding geographic area. The indicator management module 44 selects the point 102 as the focal point and selects visual properties of indicators 110-114 based at least in part on the distance to the point 102. The indicators in this case represent restaurants, which the geographic application 42 can display in response to an explicit user request, such as geographic query ("restaurants," "Mediterranean food," "burgers," etc.) or as automatic suggestions, or an implicit user request.

The indicator 110 corresponds to a geographic location proximate to the location corresponding to the point 102. Accordingly, the indicator management module 44 generates the indicator 100 as a relatively large dot including graphic symbols to represent the type of the POI (a knife and a fork) as well as a text label specifying the name of the restaurant. The indicators 112 correspond to geographic locations less proximate to the location corresponding to the point 102 than the location represented by the indicator 110. The indicator management module 44 in this case generates smaller dots including smaller graphic symbols, and does not generate labels for the indicators 112. Further, indicators 114 correspond to geographic locations less proximate to the location corresponding to the point 102 than the locations represented by the indicators 112, and even less proximate that the location represented by the indicator 110. The indicator management module 44 generates even smaller dots that include neither graphic symbols nor text labels. As illustrated in FIG. 2, the indicators 110-114 overlay the digital map 100 that has the same level of magnification, or zoom level, in all portions of the map viewport. In other words, the indicator management module 44 modifies visual properties of at least some of the indicators of POIs without modifying visual properties of map features that make up the digital map.

In the example of FIG. 2, the visual properties the indicator management module 44 selects in view of the distance to the focal point include size, presence of a graphic icon, and the amount of text. More generally, the indicator management module 44 can select one or more of any suitable number of visual properties. In addition to the examples listed above, the visual properties can include color intensity, level of transparency, multimedia content (e.g., photographs, videos), interactive controls for retrieving navigation directions to the POI, etc.

The indicator management module 44 in general can use any suitable number of categories of visual properties with the indicators. In the example above, the indicator management module 44 uses three categories corresponding to the indicators 110, 112, and 114, respectively. In another implementation, the indicator management module 44 does not use discrete categories and instead gradually increases the size of an indicator in accordance with the growing proximity to the point 102. More particularly, the indicator management module 44 in this case calculates the size of an indicator as a function of the distance to the focal point. The indicator management module 44 similarly can determine the other visual properties, such as the level of transparency or color.

When the user repositions the viewport, the indicator management module 44 can automatically adjust the visual properties of some or all of the indicators in view of the changes in the distance to the focal point. The indicator management module 44 thus can effectively animate the content in the map viewport, so that the indicators appear to grow and diminish in size as the map viewport is moving relative to the underlying digital map.

In the scenario schematically illustrated in FIGS. 3A and 3B, a map viewport 152 is moving relative to a digital map 150 in a direction indicated by arrow 154. To avoid clutter, the digital map 150 is illustrated in FIGS. 3A and 3B without any map features. The movement of the map viewport 152 may be due to the user applying a gesture such as a "swipe" to the map viewport 152 via the touchscreen which the digital map 150 is displayed, submitting a typed command or a voice command such as "pan East," moving in the direction indicated by the arrow 154, with the geographic application 42 automatically advancing the map viewport 152 in accordance with the user's movement, etc. The zoom level of the digital map 150 remains the same as the map viewport 152 moves. Similar to the scenario discussed above, the focal point in this example is the geometric center of the map viewport 152.

The indicator management module 44 generates indicators 160-164 independently of rendering the digital map 150 and adjusts visual properties of the indicators 160-164 in view of their distance to the focal point. Thus, when the viewport 152 is positioned as illustrated in FIG. 3A, the indicator management module 44 generates a larger and more detailed indicator 160 for a POI proximate to the focal point, smaller indicators 162A and 162B for the POIs positioned farther away from the focal point than the POI represented by the indicator 160, and even smaller indicators 164A-D for POIs positioned farther away from the focal point than the POIs represented by the indicators 164. When the viewport 152 is repositioned as illustrated in FIG. 3B, the indicator management module 44 modifies the visual properties of the indicators 160 and 162B to make the resulting indicators 160' and 162B' appear similar to the indicator 164A, and modifies the indicators 164B and 164C to make the resulting indicators 164B' and 164C' larger and more detailed, similar to the indicators to the indicators 162B and 160, respectively, of FIG. 3A.

Figure 4:
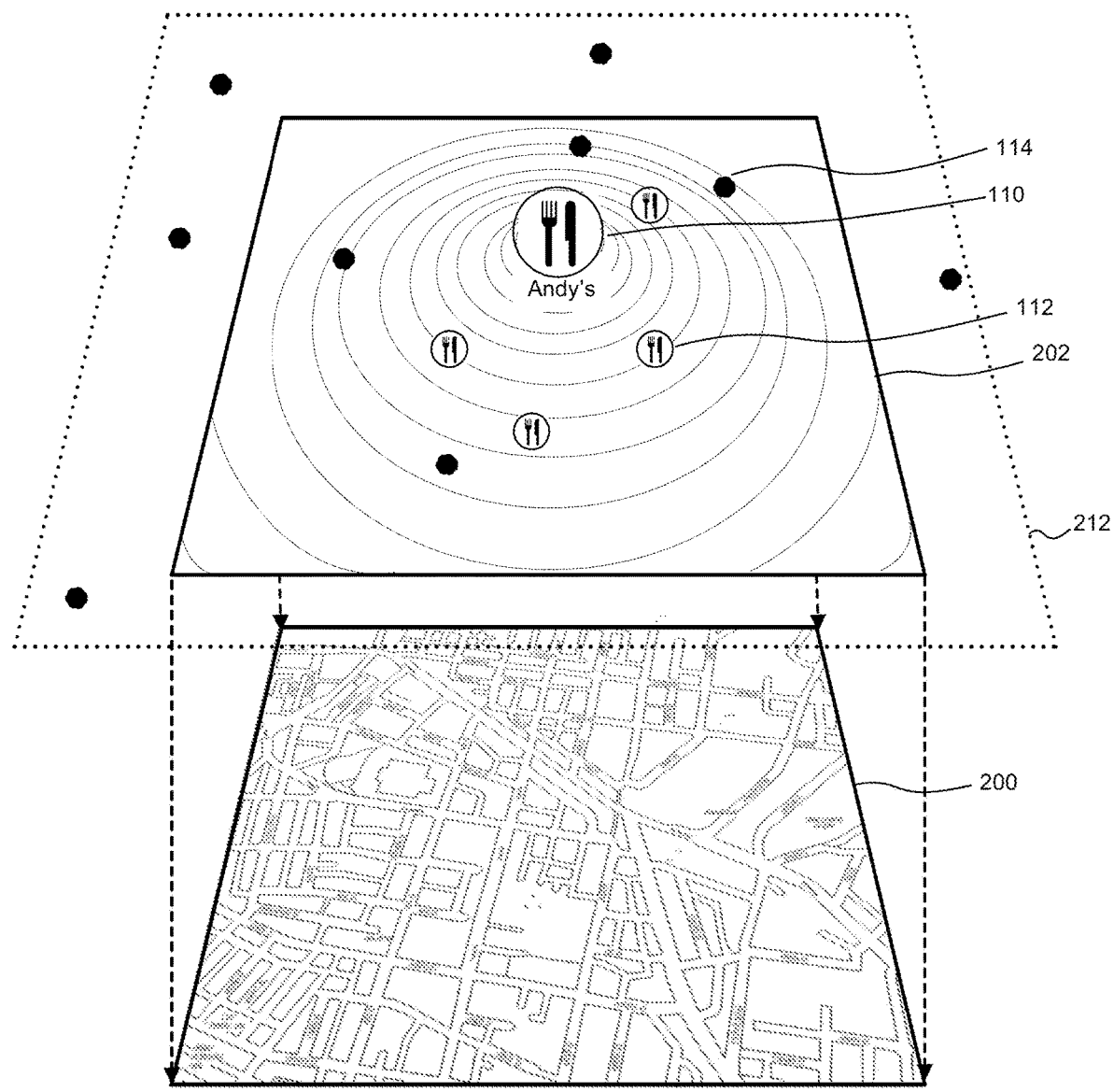
FIG. 4 schematically illustrates layering of indicators on a digital map, where the visual properties of indicators are dynamically varied, which can be implemented in the system of FIG. 1.

In some implementations, the geographic application 42 maintains separate layers for map data and indicators of POIs, and the indicator management module 44 dynamically modifies the layer of indicators without modifying the layer of the digital map. For example, FIG. 4 illustrates how the geographic application 42 can construct the digital map of FIG. 2 by layering an indicator tile 202 over a map tile 200. As illustrated in FIG. 4, indicators are disposed on a layer 202, and the indicator management module 44 modifies the visual properties of the indicators in view of their distance to the focal point. FIG. 4 for further clarity depicts contour lines (similar to a topographic map) to illustrate virtual elevation of indicators relative to the "floor" of the indicator tile 202. In particular, the indicator 110 appears to be at a higher elevation, and thus larger, than the indicators 112 and 110, and the indicators 112 appears to be at a higher elevation than the indicators 114. It is noted that the contour lines are illustrated in FIG. 4 for clarity only, and that the geographic application 42 generally does not display the contour lines when displaying indicators on a digital map.

Figure 5:
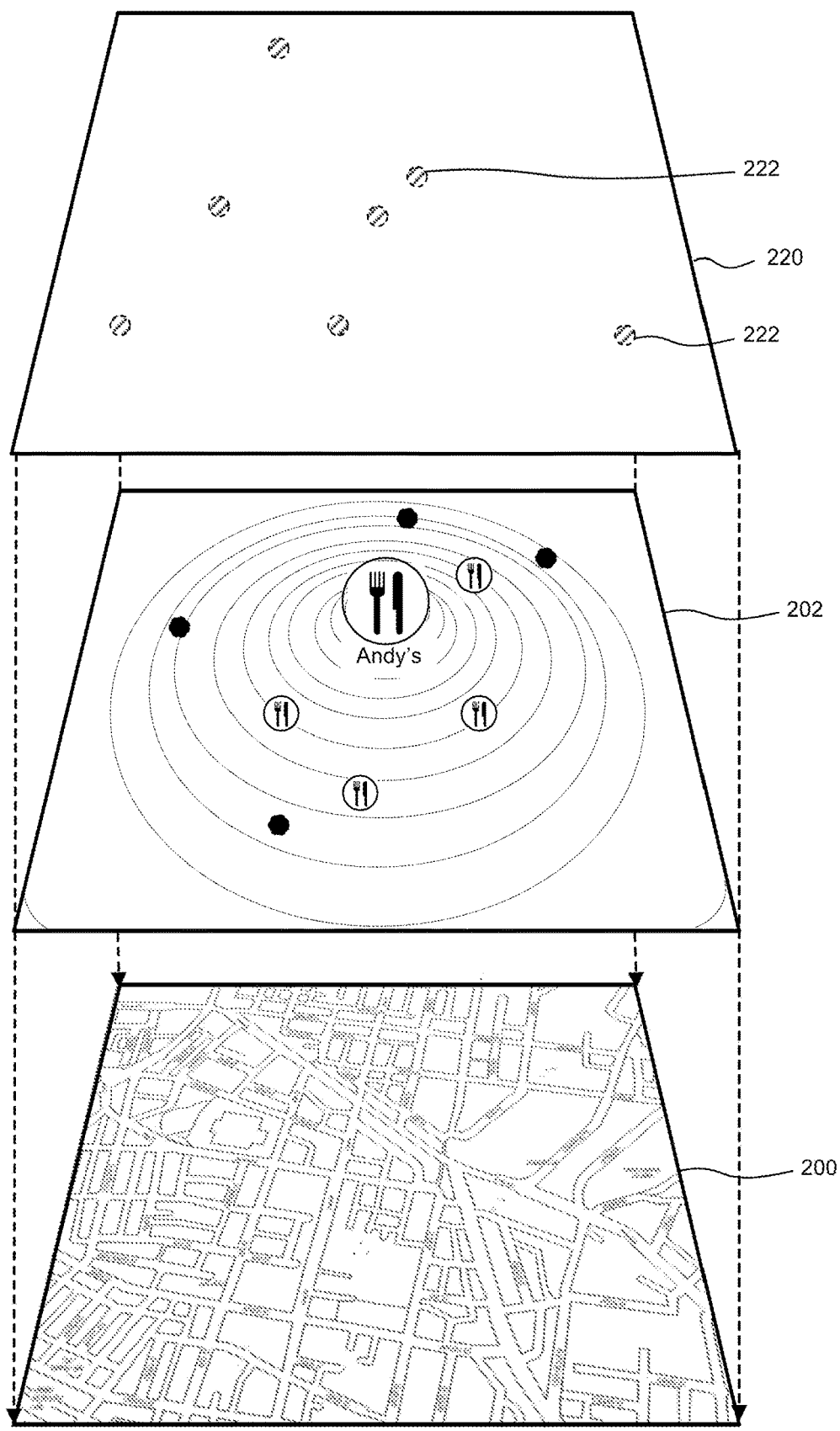
FIG. 5 schematically illustrates another layering of indicators on a digital map, where the visual properties of some indicators are dynamically varied while the visual properties of other indicators are not varied, which can be implemented in the system of FIG. 1.

In some implementations and/or scenarios, the geographic application 42 dynamically modifies the visual properties only for certain categories of indicators without modifying the visual properties of the other indicators. For example, when generating suggestions for a geographic area, the geographic application 42 can identify POIs corresponding to restaurants as well as POIs corresponding to stores, museums, music venues, etc. Based on such signals as time of day and user preferences, for example, the indicator management module 44 can decide to vary the visual properties of indicators that represent restaurants while presenting identical or similar indicators for POIs that belong to other categories. The indicator management module 44 in an example implementation thus can dynamically vary the size and/or level of detail of indicators that represent lunch places between 11:30 am and 1:00 pm without dynamically varying the visual properties of other indicators, and dynamically vary the size and/or level of detail of indicators that represent lunch bars between 9:00 pm and 1:00 am without dynamically varying the visual properties of other indicators, etc. An example of this implementation is schematically illustrated in FIG. 5, where the layering includes the map tile 200, the indicator tile 202 with dynamically varying indicators, and another indicator tile 220 with non-varying indicators 222 (accordingly, the indicator tile 220 is depicted without contour lines).

Figure 6:
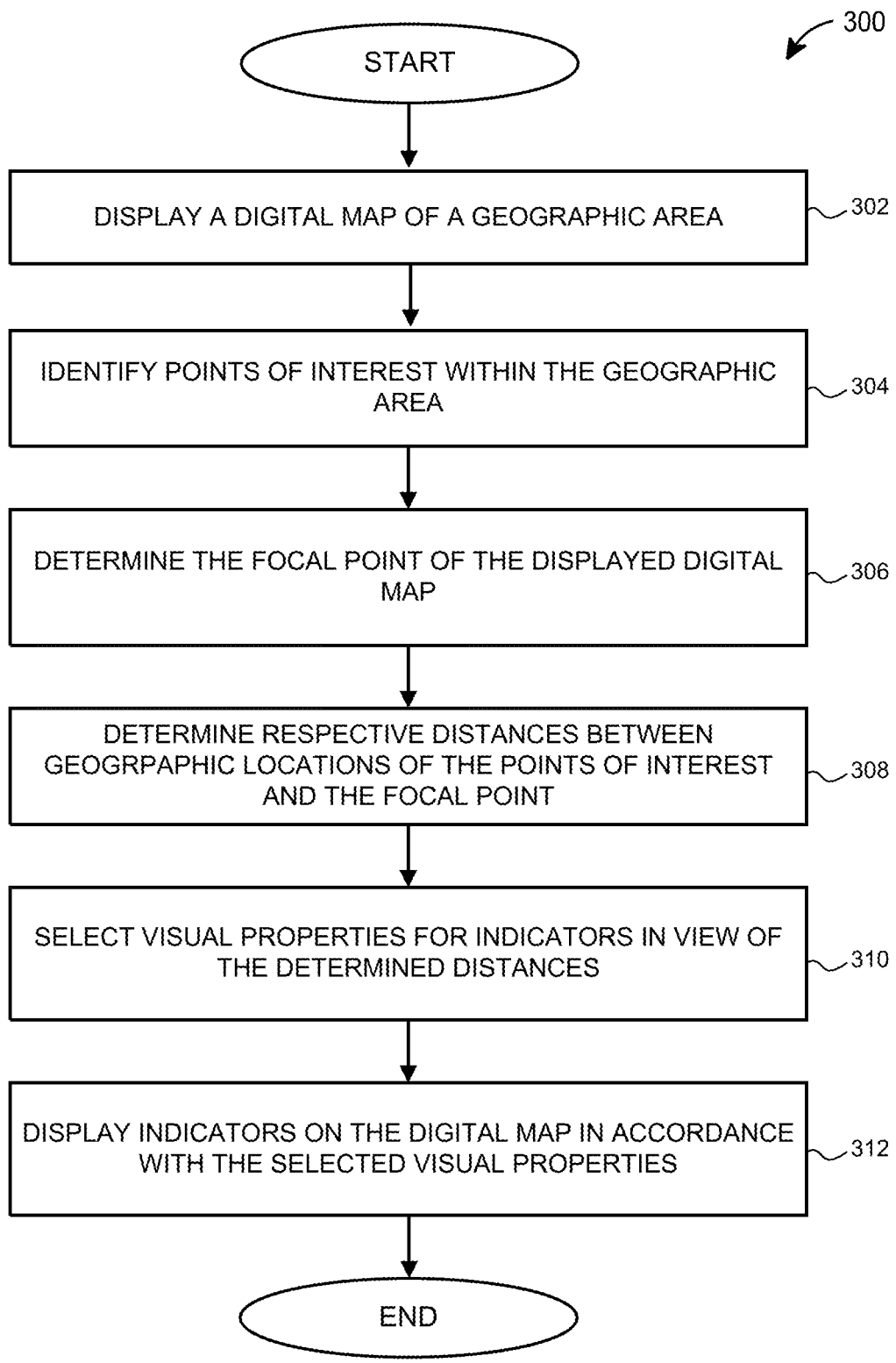
FIG. 6 is a flow diagram of an example method for displaying indicators on a digital map in accordance with a distance to a focal point, which can be implemented in the system of FIG. 1.

Now referring to FIG. 6, an example method 300 for displaying indicators on a digital map can be implemented as a set of instructions stored on a computer-readable medium and executable by one or more processors. The method 300 can be implemented in the indicator management module 44, another suitable software module operating in a user device, or a software module operating in a network server. According to the latter embodiment, a network server such as the server 60 of FIG. 1 generates map tiles in a vector format or a raster format, applies the techniques of this disclosure for dynamically varying visual properties of indicators, and supplies the generated map tiles to the user device 12.

The method 300 begins at block 302, where a digital map of a geographic area is displayed via a user interface of a user device, with the map viewport defining the currently visible portion of the digital map.

At block 304, POIs within the geographic area are identified. The POIs in various scenarios correspond to search results responsive to a geographic query, locations near a navigation route responsive to a request for directions, automatically generated suggestions, etc. The POIs can represent permanent locations such as businesses, stations and bus stops, museums, etc. as well as locations where temporary events take place. The geographic application 42, or another suitable module in which the method 300 is implemented, can identify POIs by querying one or several network servers or by retrieving data from a local cache implemented in the memory of the user device.

Next, at block 306, the focal point of the displayed digital map is determined. The focal point in one implementation is the geometric center of the map viewport. Additionally or alternatively, the focal point can be the point of contact of the user's finger with the touchscreen. More specifically, the geographic application can initially present indicators in a uniform manner, i.e., without varying the visual properties of the indicators, or in a non-uniform manner with the geometric center of the map viewport defining the initial position of the focal point. After the user taps on the screen, the geographic application can reposition the focal point to the point of contact. The user need not maintain contact with the touchscreen in this embodiment and, after tapping on the new focal point, the user then can tap on the desired indicator. Thus, in response to the user tapping near a corner of the touchscreen, for example, the geographic application can visually de-emphasize (e.g., reduce the size, detail, color intensity) indicators near the geometric center of the map viewport and emphasize the indicators near the point where the user tapped on the screen.

A geographic application operating on a desktop or laptop computer equipped with a mouse can operate in a generally similar manner, with the location of the mouse point defining the focal point. The user thus can mouse over to a certain location on the map without clicking at that location, and the geographic application can select the location of the mouse cursor as the focal point.

In another implementation or scenario, the focal point corresponds to the current location of the user device in the geographic area represented by the digital map. More generally, the geographic application can determine the focal point using any suitable number of signals. In any case, the focal point can define the context for adjusting visual properties of interactive indicators.

In particular, at block 308, distances between indicators and the focal point are determined. The distances can be measured in any suitable manner: the number screen pixels, real-world straight-line distance between the physical objects represented by the indicators, real-world driving distance (or time) between the physical objects represented by the indicators, etc. Using the determined distances, visual properties for indicators can be selected. In some implementations, visual properties can be assigned to indicators that belong to certain distance bands: a first set of visual properties can be assigned to indicators that are located at distance d that is smaller than the first threshold distance $d_1$, a second set of visual properties can be assigned to indicators that are located at distance d that is greater than $d_1$ but smaller than the second threshold distance $d_2$, etc. In another implementation, the geographic application determines each set of visual properties as a function of the determined distance without limiting the number of sets to any particular number of bands.

Each set of visual properties can include one or more size of the indicator, color intensity, level of transparency, the amount of graphic detail (e.g., a simple graphic icon, a more detailed graphic icon), the amount of text (e.g., no text, name only, name and address), visibility of additional controls such as a control for requesting navigation directions to the location, etc. A set of visual properties is selected at block 310 in view of the determined distances. The method then proceeds to block 312, where indicators are displayed in accordance with the selected visual properties.

In some cases, the geographic application 42 can generate relatively large indicators (such as the indicators 110 and 160 of FIGS. 2 and 3A, respectively) for several nearby locations. As a result, the large indicators may collide (i.e., at least partially overlap). The geographic application 42 can resolve collisions between indicators by comparing the relative importance, popularity score, and/or other parameters of the POIs represented by the colliding indicators, and determine which of the indicators should obscure another indicator in view of the comparison. Further, in some implementations, the geographic application 42 can present a disambiguation menu to allow the user to select the desired indicator.

Figure 7:
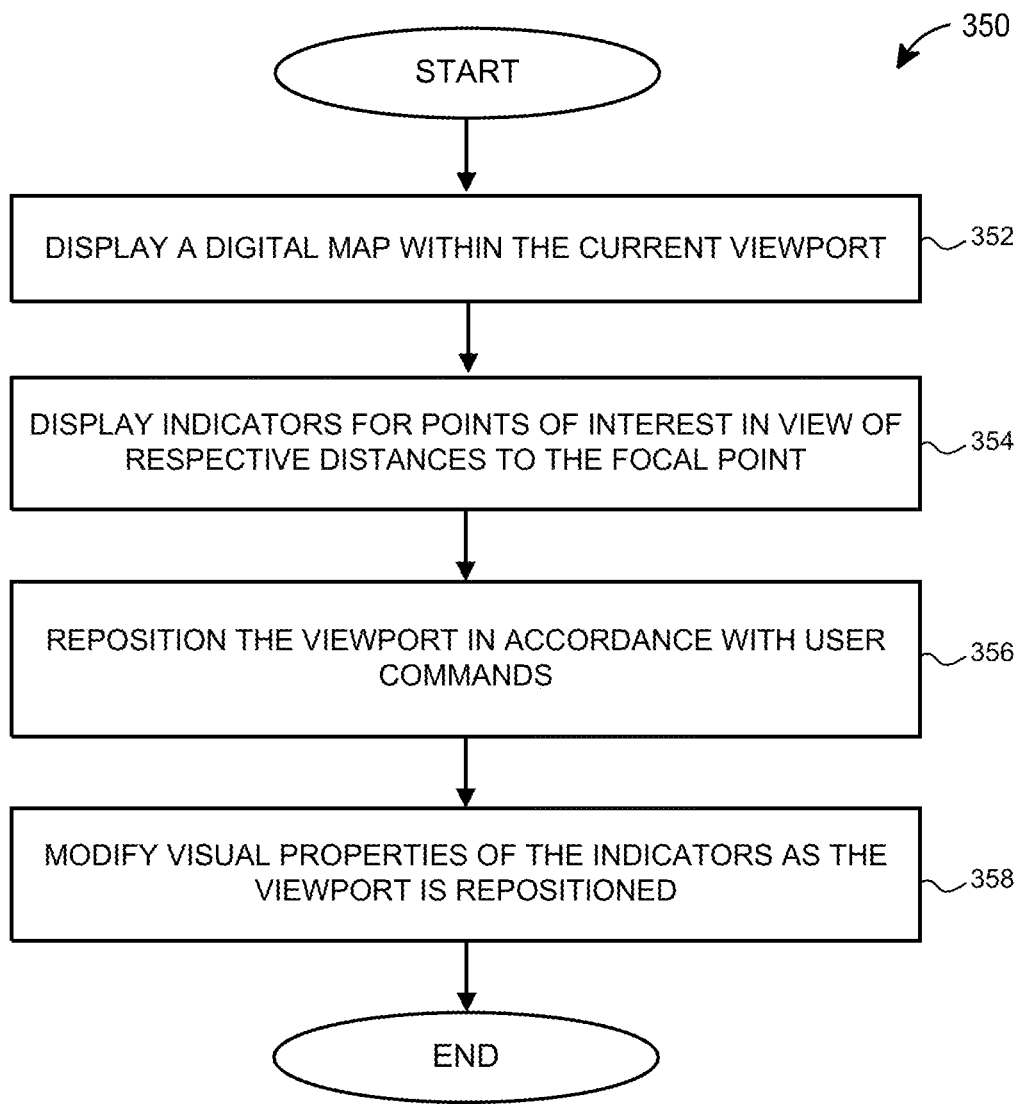
FIG. 7 is a flow diagram of an example method for modifying visual properties of indicators overlaid on a digital map in accordance with viewport movement, which can be implemented in the system of FIG. 1

Next, FIG. 7 illustrates a flow diagram of an example method 350 for modifying visual properties of indicators overlaid on a digital map in accordance with viewport movement. Similar to the method 300 discussed above, the method 350 can be implemented as a set of instructions stored on a computer-readable medium and executable by one or more processors. The method 350 can be implemented in the indicator management module 44, another suitable software module operating in a user device, or a software module operating in a network server.

The method 350 begins at block 352, where a digital map is displayed within the current viewport. Indicators for various POIs are displayed in the map viewport in view of the respective distances to the focal point of the map viewport (block 354). The viewport is repositioned at block 356 in accordance with user commands. The user for example can apply a gesture such as a swipe or a flick, type in or speak a command, etc. The geographic application then can modify the visual properties of the indicators. Depending on the implementation, the geographic application can apply new visual properties once the viewport stop moving, or the geographic application can apply new visual properties substantially in real time as the viewport is moving.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

Upon reading this disclosure, those of ordinary skill in the art will appreciate still additional alternative structural and functional designs for dynamically varying visual properties of indicators on a digital map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for displaying geographic content in a computing device, the method comprising:
 displaying, via a user interface within a map viewport, an underlying digital map including a plurality of features representing respective entities in a geographic area, each of the plurality of features being displayed at a same level of magnification;

determining, by one or more processors, a plurality of geolocated points of interest within the geographic area, wherein the points of interest belong to a plurality of categories;

determining, by the one or more processors, a focal point of the map viewport;

determining, by the one or more processors, a subset of the plurality of categories; and displaying, within the map viewport, respective symbolic indicators for the plurality of points of interest overlaid on the underlying digital map to depict locations of the points of interest on the underlying digital map, including, for each of the plurality of indicators in the subset of categories only, varying a size of the indicator independently of visual properties of the underlying digital map and in accordance with a distance between a geographic location corresponding to the indicator and a geographic location corresponding to the focal point of the map viewport.

2. The method of claim 1, further comprising varying a color of the indicator in accordance with the distance between the geographic location corresponding to the indicator and the geographic location corresponding to the focal point of the map viewport.

3. The method of claim 1, further comprising varying a level of detail at which the indicator is displayed in accordance with the distance between the geographic location corresponding to the indicator and the geographic location corresponding to the focal point of the map viewport.

4. The method of claim 1, wherein determining the focal point includes determining a geometric center of the viewport, the geometric center defining the focal point.

5. The method of claim 1, wherein displaying the underlying digital map includes displaying the underlying digital map on a touchscreen, and wherein determining the focal point includes determining a point of contact within the viewport, the point of contact defining the focal point.

6. The method of claim 1, further comprising:
determining a current location of the computing device; and
determining a point within the map viewport representing the current location of the computing device, the determined point defining the focal point.

7. The method of claim 1, further comprising receiving a geographic query including one or more search terms; and wherein determining the plurality of geolocated points of interest includes receiving a plurality of geolocated search results in response to the geographic query.

8. The method of claim 1, further comprising receiving, via the user interface, a selection of a geographic area; wherein determining the plurality of geolocated points of interest includes receiving indications of automatic suggestions located within the geographic area.

9. The method of claim 1, wherein varying the size of the indicator includes:
assigning a first size to the indicator if the indicator is located at a distance smaller than a first threshold distance; and
assigning a second size to the indicator if the indicator is located at a distance larger than the first threshold distance but smaller than a second threshold distance.

10. A computing device comprising:
a user interface;
processing hardware;
a non-transitory computer-readable memory storing thereon instructions that, when executed by the processing hardware, cause the computing device to:

display, via the user interface within a map viewport, an underlying digital map including a plurality of features representing respective entities in a geographic area, each of the plurality of features being displayed at a same level of magnification, determine a plurality of geolocated points of interest within the geographic area, wherein the points of interest belong to a plurality of categories, determine a focal point of the map viewport;

determine a subset of the plurality of categories; and display, within the map viewport, respective symbolic indicators for the plurality of points of interest overlaid on the underlying digital map to depict locations of the points of interest on the underlying digital map, including, for each of the plurality of indicators in the subset of categories only, varying a size of the indicator independently of visual properties of the underlying digital map and in accordance with a distance between a geographic location corresponding to the indicator and a geographic location corresponding to the focal point of the map viewport.

11. The computing device of claim 10, wherein the instructions, when executed by the processing hardware, cause the computing device to vary a color of the indicator in accordance with the distance between the geographic location corresponding to the indicator and the geographic location corresponding to the focal point of the map viewport.

12. The computing device of claim 10, wherein the instructions, when executed by the processing hardware, cause the computing device to vary a level of detail at which the indicator is displayed in accordance with the distance between the geographic location corresponding to the indicator and the geographic location corresponding to the focal point of the map viewport.

13. The computing device of claim 10, wherein to determine the focal point, the instructions cause the computing device to determine a geometric center of the viewport, the geometric center defining the focal point.

14. A method for displaying geographic content in a computing device, the method comprising:
providing, by one or more processors via a user interface, an underlying digital map within a map viewport to depict a first geographic area, the map defining a currently viewable portion of the underlying digital map;
panning, by the one or more processors, the map viewport relative to the digital map in accordance with user commands received via a user interface, to depict a second geographic area at a same zoom level as the first geographic area, the first geographic area and the second geographic area overlapping to define a region of overlap; and
displaying a symbolic indicator of a point of interest in the region of overlap to depict a location of the points of interest on the underlying digital map, including:
determining whether the point of interest belongs to certain category in a plurality of categories, and
in response to determining that the point of interest belongs to the certain category, modifying a size of the indicator independently of visual properties of the underlying digital map and as the map viewport is panned from the first geographic area to the second geographic area.

15. The method of claim 14, further comprising:
determining, by the one or more processors, a focal point of the map viewport; and
determining, by the one or more processors, a distance between a geographic location corresponding to the indicator and a geographic location corresponding to the focal point;
wherein modifying the size of the indicator includes modifying the size in accordance with the determined distance.

16. The method of claim 15, wherein determining the focal point of the map viewport includes determining a geometric center of the map viewport.

17. The method of claim 15, wherein determining the focal point of the map viewport includes determining a current location of the computing device.

18. The method of claim 15, wherein displaying the underlying digital map includes displaying the underlying digital map on a touchscreen, and wherein determining the focal point includes determining a point of contact within the viewport.

* * * * *